Aug. 1, 1961   G. E. SERNIUK ET AL   2,994,357
MODIFICATION OF RUBBERY COPOLYMERS
Filed July 6, 1956
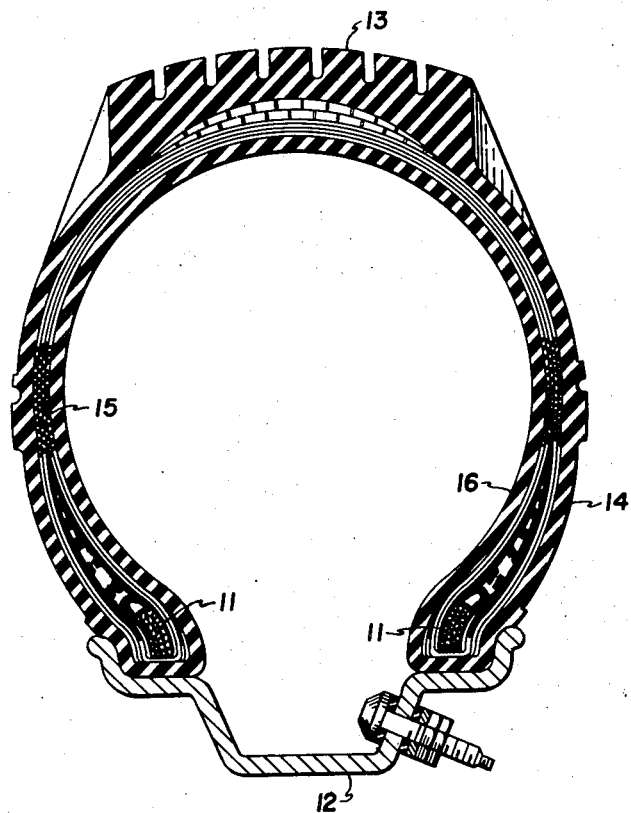
George E. Serniuk
Francis P. Baldwin   Inventors
By *H. H. Smyers*   Attorney Patented Aug. 1, 1961

2,994,357
MODIFICATION OF RUBBERY COPOLMERS
George E. Serniuk, Roselle, and Francis P. Baldwin, Colonia, N.J., assignors to Esso Research and Engineering Company, a corporation of Delaware
Filed July 6, 1956, Ser. No. 596,219
19 Claims. (Cl. 152—330)

This invention relates to novel rubber reaction products and to methods of preparing and using the same. More particularly, the present invention relates to the reaction of isoolefin-multiolefin containing rubbery copolymers, particularly butyl rubber, with minor proportions of certain azo compounds.

Butyl rubber, which comprises the low unsaturation copolymerization product of a major proportion of an isoolefin and a minor proportion of a multiolefin, has been available commercially for a number of years and has found utility in the manufacture of certain products such as automobile inner tubes, electrical insulation, tire curing bags or bladders and the like. In some respects butyl rubber is superior to natural rubber or any of the high unsaturation synthetic rubbers such as diene-styrene rubber, diene-nitrile rubber, polychloroprene rubber, etc., which have an unsaturation in the order of about 300 to 400 iodine number (Wijs). This is because the low unsaturation of butyl rubber renders the product, both before and after vulcanization, more resistant to oxidation and attack by chemical agents than the above mentioned highly unsaturated rubbery materials.

However, butyl rubber, due to its low unsaturation, has heretofore shown a lower degree of compatibility, reinforcement, or interaction with commonly used fillers such as carbon black, silica, clays, etc. compared to the high unsaturation rubbers. This low degree of compatibility with fillers, as exemplified by a relatively low resistivity value, has somewhat restricted the amount of fillers commonly incorporated into butyl rubber blends to be vulcanized. Also, although the ozone resistance of butyl rubber is much greater than that of the highly unsaturated rubbers, since only smaller amounts of fillers could be employed in conjunction with butyl rubber, electrical insulation made from butyl rubber has been somewhat more expensive than insulation made from more highly unsaturated rubbers extended with large amounts of fillers. It is, therefore, very desirable to have available a butyl-type rubber having a high resistivity value which may also tolerate the addition of relatively large amounts of fillers thereto. Also, in the production of tires, it is desirable for certain layers therein and especially for those layers exterior to the carcass to have a combination of both high tensile strength and high modulus.

The present invention overcomes the above mentioned disadvantages and makes available a rubbery material of high resistivity which upon vulcanization exhibits a combination of both high tensile strength and high modulus as will be apparent from the following description wherein reference will be made to the drawing in which the single figure is a vertical section of a pneumatic tubeless tire employing therein butyl rubber modified by azo compounds in accordance with the invention.

According to the present invention, it has now been discovered that rubbery isoolefin-multiolefin copolymers, particularly butyl rubber, can be improved as to resistivity, modulus, and tensile strength by reacting the rubbery copolymer with a minor proportion of an azocarboxylated hydrocarbon such as a $C_1$ to $C_{18}$ alkyl or cycloalkyl or a $C_6$ to $C_{18}$ aryl, aralkyl or alkaryl azomonocarboxylate and/or azodicarboxylate.

The azocarboxylate compounds, suitable for use in accordance with the present invention, preferably fall within the two classes of azo compounds having the following formulae. The first class of azo-compounds fall within the class of azomonocarboxylate compounds having the general formula

wherein R and $R_1$ are $C_1$ to $C_{18}$, preferably $C_1$ to $C_{12}$ alkyl or $C_3$ to $C_{12}$ cycloalkyl groups, or $C_6$ to $C_{24}$, preferably $C_6$ to $C_{18}$ aryl, aralkyl, or alkaryl groups. Typical azomonocarboxylate compounds falling under the above formula are ethyl phenylazocarboxylate, phenyl hexylazocarboxylate, ethyl isooctylazocarboxylate, ethyl naphthalene azocarboxylate, ethyl azoacetic acid carboxylate, ethyl-2,4-dinitrobenzene azocarboxylate, chloroethyl diphenyl azocarboxylate, and ethyl dimethylpyrazole azocarboxylate.

The other type of azo-compounds suitable for use in accordance with the present invention are azodicarboxylate compounds having the general formula

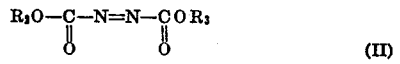

wherein $R_2$ and $R_3$ are $C_1$ to $C_{18}$, preferably $C_1$ to $C_{12}$ alkyl or $C_3$ to $C_{12}$ cycloalkyl groups, or $C_6$ to $C_{24}$, preferably $C_6$ to $C_{18}$ aryl, aralkyl, or alkaryl groups. Typical azodicarboxylate compounds falling under the last mentioned formula are ethyl azodicarboxylate, phenylazodicarboxylate, isopropylazodicarboxylate, ethylphenylazodicarboxylate, dodecylazodicarboxylate, 2,4-dinitrophenylazodicarboxylate, cresylazodicarboxylate, eugenolazodicarboxylate, beta-naphthylazodicarboxylate, methylsalicylazodicarboxylate, thiophenylazodicarboxylate, salicylaldehydeazodicarboxylate, chloroethylazodicarboxylate, ethyleneglycolazodicarboxylate, and chloroethylphenylazodicarboxylate.

In practicing the present invention, an isoolefin-multiolefin copolymer such as butyl rubber or the like is reacted with one or more of the foregoing types of azomonocarboxylate and/or azodicarboxylate compounds at a temperature between about −40° C. and 150° C., preferably between about 0° and 100° C. for a time between about 10 minutes and 50 hours, preferably between about 0.5 and 20.0 hours, so as to contain combined therein about 0.1 to 1.0 mole of combined azocarboxylate compound per double bond in the rubbery polymer. In other words, the rubbery polymer advantageously contains between about "0.1X" to "X" (preferably between about "0.2X" to "0.6X") weight percent of the azocarboxylate compound, wherein:

$$X = \frac{A(L)}{(100-L)M_1 + L(M_2+A)} \times 100$$

and:
L = mole percent of the multiolefin in the copolymer,
$M_1$ = molecular weight of the isoolefin,
$M_2$ = molecular weight of the multiolefin, and
A = molecular weight of the azocarboxylate compound.

In one embodiment of the invention, the rubbery copolymer is preferably dissolved in a substantially inert solvent such as benzene, cyclohexane, toluene, chloroform, or octane; the azocarboxylate compound being then added to the resulting solution. Reaction is then allowed to ensue at temperatures between about 20° and 70° C., for between about 30 minutes up to about 15 hours. The reaction is advantageously catalyzed by such acid catalysts as sulfuric acid or perchloric acid, and/or metal halides such as boron trifluoride; and/or peroxide catalysts such as cumyl peroxide, tertiary butyl hydroperoxide, hydrogen peroxide, perbenzoic acid, tertiary butyl perbenzoic acid, benzoyl peroxide, or ditertiary butyl peroxide, etc. The product formed may be recovered from the reaction mixture by flashing off the inert solvent or alternatively by a multiple solution-precipitation technique using such materials as hexane, chloroform, benzene, cyclohexane, or octane, as solvents; acetone, methyl alcohol, dioxane, or isopropanol, being suitable anti-solvents. Residual solvents are then advantageously removed by heating (preferably under about .05 to 20 p.s.i.a.) for about 0.5 to 50 hours (e.g. 1–15 hours) at about 40° to 150° C., preferably at about 50° to 120° C.

In compounding the azocarboxylate-modified rubbery copolymer for vulcanization, it is preferred to pre-mix the modified polymer, mold release agent (such as stearic acid), and filler; which mixture is advantageously hot milled, prior to vulcanization, for about 1 to 60 minutes at about 200° to 450° F., prior to adding the curatives. The hot milled stock is then cooled and blended with about 2 to 30 parts by weight of a bivalent metal oxide (preferably zinc oxide), about 0.5 to 5.0 parts by weight sulfur and about 0.3 to 3.0 parts by weight of an ultra accelerator such as a tetraalkyl thiuram sulfide or especially a tellurium dialkyl dithiocarbamate. Alternatively, the azocarboxylate-modified butyl rubber may be blended directly, for example on a cold rubber mill, with not only the filler and mold release agent such as stearic acid but also with the curatives. Alternative or supplemental vulcanizing agents may also be employed, such as polyfunctional amines, imines or amides; non-sulfur quinoid curing agents such as quinone dioxime and its derivatives and homologues, such as dinitroso-aromatic compounds such as p-dinitroso benzene, etc. The filler likewise need not be a carbon black but may be a silica, hydrated silica, titanium dioxide, clay, etc., or an admixture of a carbon black with such fillers as hereinbeforementioned. The compounded azocarboxylate modified isoolefin-multiolefin rubbery compositions of the present invention, prior to vulcanization, may also be blended with minor proportions of phenolic-aldehyde resins, urea-aldehyde resins, glyptal resins, polyvinyl alkanal resins, hydrocarbon plasticizer oils, tars, pitches, waxes, organic esters, etc.

Vulcanization of the foregoing compositions according to the present invention is advantageously for about 5 minutes to about 5 hours (e.g. 10 minutes to 3 hours) at about 250° to 350° F. or for about 1 to 10 minutes at about 350° to 450° F. The higher the vulcanization temperature, the shorter may be the vulcanizing time and vice versa. The optimum vulcanization conditions appear to be for about 10 to 100 minutes at about 270° to 370° F., preferably at about 285° to 350° F. Insofar as the degree of fineness of the sulfur is concerned, the sulfur may pass through a 50 mesh to about a 500 mesh screen. However, a fineness of about 200 to 350 mesh or finer appears to be preferable for the purposes of the present invention.

Butyl rubber or GR–I rubber (Government rubber-isobutylene) as referred to herein and in the prior art comprises the copolymerization product of a major proportion of a $C_4$ to $C_{14}$ isoolefin and a minor proportion of a $C_4$ to $C_{18}$ multiolefin. Copolymers of the above general type, especially where the copolymer is of about 70 to 99.5% isobutylene or 2-methyl-butene-1 with about 0.5 to 30% of a $C_4$ to $C_8$ or $C_{10}$ conjugated diolefin such as isoprene, butadiene, piperylene, dimethylbutadiene, or such multiolefins as dimethallyl, cyclopentadiene, cyclohexadiene, allo-ocymene, etc. are commonly referred to in patents and literature as "Butyl Rubber," e.g. textbook "Synthetic Rubber" by G. S. Whitby (1954 edition). The expression "butyl rubber" as employed in the specification and claims is defined essentially as a copolymer of about 85 to 99.5% by weight of an isoolefin of about 4 to 8 carbon atoms and about 15 to 0.5% of a multiolefin of about 4 to 10 carbon atoms. The preparation of a butyl type rubber is described in U.S. Patent 2,356,128 to Thomas et al.; as well as in literature.

In preparing butyl rubber, a low molecular weight isoolefin, such as 2-methyl-butene-1 or preferably isobutylene, may be copolymerized with a multiolefin such as a conjugated diolefin, preferably isoprene, at relatively low temperatures; generally from about 0° C. to about −200° C. or lower; an advantageous range being from about −40° C. to about −180° C., preferably from about −80° to −160° C. The copolymerization is conducted in the presence of a Friedel-Crafts catalyst such as aluminum chloride, titanium tetrachloride, boron trifluoride, uranium chloride, aluminum ethoxy-chloride, etc., preferably dissolved in an alkyl halide such as ethyl or methyl chloride, or dissolved in carbon disulfide or an equivalent solvent.

One particularly advantageous butyl rubber is produced with the preferred reactants being about 0.5 to 5.0 parts by weight of isoprene and about 95.0 to 99.5 parts by weight of isobutylene. The mixture of these reactants is cooled to a temperature within the range of about −50° C. to −150° C. and then polymerized by the addition thereto of a catalyst solution of an aluminum halide, such as aluminum chloride dissolved in methyl chloride. The resulting copolymer preferably has an iodine number (Wijs) between about 0–50 (preferably about 1–20) and a Staudinger molecular weight between about 20,000 and 200,000 and even more especially between about 30,000 and 150,000. When so prepared, the material is rubbery in nature and has the property of being curable with sulfur especially in the presence of bivalent metal oxides such as zinc oxide and/or in the presence of organic sulfides, particularly of the alkyl thiuram sulfide or thiocarbamate types.

Other suitable isoolefin-multiolefin copolymers other than butyl rubber which are advantageously chemically modified in accordance with the present invention by reaction with azocarboxylate compounds comprise copolymers prepared from feeds composed of about 50 to 100 parts by weight of a $C_4$ to $C_{14}$ multiolefin such as a $C_4$ to $C_{10}$ conjugated diolefin with about 100 parts by weight of a $C_4$ to $C_8$ isoolefin such as isobutylene or 2-methyl butene-1. Such copolymers generally have iodine numbers between about 20 and 200 (Wijs), preferably between about 30 and 150. Still another class of isoolefin-multiolefin copolymers comprises copolymerization products formed from feeds comprising about 100 to 800 parts by weight of a $C_4$ to $C_{14}$ multiolefin with about 100 parts by weight of a $C_4$ to $C_8$ isoolefin. These copolymers generally have iodine numbers (Wijs) between about 50 and 350, preferably between about 125 and 275.

It is also within the purview of the present invention to chemically modify with azocarboxylate compounds, tripolymers of isoolefins, multiolefins and monoolefinic compounds such as styrene, alpha methyl styrene, p-methyl styrene, indene, dihydronaphthalene, p-chlorostyrene, dichlorostyrene, mixtures thereof, etc. The amount of the monoolefinic compound, if present, is generally used in a minor proportion based on total reacting monomers and is preferably employed in amounts such that between about 0.05 and 20, preferably between about 0.5 and 5.0 weight percent of the monoolefinic compound is combined in the resulting copolymer. Monoolefinic compounds having at least one aromatic nucleus (i.e. vinyl aromatic compounds, especially vinyl aromatic hydrocarbons) are the preferred type of third comonomer.

The present invention also contemplates new and useful cements including such rubbery isoolefin-multiolefin copolymers as described above which have been modified by reaction with azocarboxylate compounds in accordance with the invention. For instance, a single cement may be employed to bond butyl rubber to metal whereas double cements are advantageously employed as tie gums to bond together unlike rubbery plastic, or elastic materials. These new double cements or tie gums are especially useful for bonding together layers or portions of natural rubber or other highly unsaturated synthetic rubbers to low unsaturation isoolefin-multiolefin interpolymers such as butyl rubber.

The foregoing cements are prepared by Friedel-Crafts catalysts of $C_4$ to $C_{14}$ isoolefins, such as isobutylene or 2-methyl-butene-1 with $C_4$ to $C_{14}$ multiolefins at temperatures between about 0° and —200° C. The cement for application to the low unsaturation rubbery material is preferably prepared from a feed composed of a $C_4$ to $C_7$ isoolefin and a $C_4$ to $C_{10}$ conjugated diolefin having a ratio of about 2 to 100 parts by weight of diolefin per 100 parts by weight of isoolefin. The unsaturation of the resulting copolymer generally corresponds to an iodine number of about 20 (Wijs) up to about 200 (preferably about 30 Wijs to about 150). The copolymer formed is then reacted with an azocarboxylate compound in accordance with the invention. The azocarboxylate-modified copolymer formed is advantageously emulsified in water to form a latex and/or is diluted with about 5 to 50%, advantageously about 10 to 40%, preferably about 15 to 30% of a polymer solvent such as hexane, heptane, benzene, naphtha, straight run mineral spirits, mixtures thereof, etc.

The polymer in the cement for application to the highly unsaturated rubber polymer is preferably copolymerized by Friedels-Crafts catalysis at temperatures between about 0° and —200° C., from feed mixtures having about 100 to 800 parts by weight of a $C_4$ to $C_{10}$ multiolefin such as allo-ocymene, cyclopentadiene, dimethyl-butadiene, piperylene, dimethallyl, or even more especially butadiene or isoprene per 100 parts by weight of a $C_4$ to $C_7$ isoolefin such as isobutylene and/or 2-methyl-butene-1. The copolymer formed preferably has an unsaturation corresponding to an iodine number (Wijs) of at least about 50 up to about 350, preferably an iodine number of about 150 (Wijs) up to about 275. This polymer is then likewise reacted with an azocarboxylate compound and solvated in any of the foregoing butyl rubber type polymer solvents, with or without subsequent emulsification with water into a latex in a colloid mill or sonic mixer such as Rapisonic homogenizer, etc.

Each of the foregoing cements also advantageously contains, per 100 parts by weight of the azocarboxylate-modified-copolymer about 0 to 30, preferably about 3 to 20 parts by weight of zinc oxide, about 0 to 100, preferably about 10 to 60 parts by weight of a filler; e.g., a carbon black, such as channel black, furnace black or thermal black (or an admixture of carbon black with a hydrated silica such as Hi-Sil 2202), about 0 to 10, preferably about 0.5 to 5.0 parts by weight of sulfur, about 0 to 5, preferably about 0.5 to 3.0 parts by weight of an ultra-accelerator such as tetramethyl thiuram disulfide (and/or tellurium diethyl dithiocarbamate) and/or about 0 to 15, preferably about 1 to 10 parts by weight of a quinoid compound or derivative such as p,p,'-dibenzoquinone dioxime and/or p-dinitroso benzene and/or p-quinone dioxime, etc. The foregoing double cements may have a different number or different types of fillers and vulcanization ingredients and may include minor proportions of phenolic aldehyde resins, hydrocarbon plasticizer oils, esters, tars, etc., without exceeding the scope of the invention. For use in tie-plies, the amount of curatives such as sulfur, accelerators, etc., is advantageously reduced or may even be eliminated.

In employing the foregoing double cements in accordance with the invention, the cements are coated on the rubbery surfaces as hereinbefore mentioned, the cements then being permitted to partially dry at temperatures between about 10° and 150° C., preferably between about 25° and 100° C., for times between about 0.5 and 200 minutes, preferably between about 1 and about 60 minutes. The two rubber surfaces thus coated with the respective cements are then placed face to face with their cemented surfaces touching, compressed under a pressure in the range of between about 0 and 6000 p.s.i.g., advantageously between about 10 and 4000 p.s.i.g., preferably between about 30 and 2000 p.s.i.g., and vulcanized for about 0.05 to 300, preferably for about 0.5 to 60 minutes at temperatures between about 200° and 450° F., preferably between about 250° and 400° F.

When coating metal surfaces including sheet metal, wire, tubing, etc., the only cement applied is the cement normally coated on the low unsaturation rubber. This cement, as mentioned above, is normally prepared from a feed composed of about 2 to 100 parts by weight of a $C_4$ to $C_{18}$, preferably a $C_4$ to $C_{12}$ multiolefin and about 100 parts by weight of a $C_4$ to $C_{14}$, preferably $C_4$ to $C_7$ isoolefin, the copolymer product formed having been subsequently reacted with an azocarboxylate compound in accordance with the present invention. This cement preferably contains curatives but may be likewise diluted with solvents and/or extended with fillers, tackifiers, viscous oils, etc. Alternatively, the copolymer, without an added solvent, may be calendered in a hot viscous state directly on to the metal to be rubber-coated or the compounded rubber may be applied to the metal in the form of a latex.

The details and the advantages of the invention will be better understood from a consideration of the following experimental data.

*Example 1*

A three liter three-way round bottom flask, fitted with a mechanical stirrer, reflux condenser, nitrogen inlet tube, and a water bath, was charged with 760 grams of a hexane solution of a commercial butyl rubber corresponding to GR–I 25 rubber; i.e., having an iodine number (Wijs) of 13.3. The hexane employed had been pretreated at room temperature with an excess of aluminum chloride to remove impurities. The hexane solution contained 10 grams of polymer per 100 milliliters of hexane, the solution being stirred at room temperature. To this solution was added 1.52 grams of crude ethylazodicarboxylate (90.0 weight percent purity). After stirring for a period of 75 minutes, the reaction mixture was allowed to stand at room temperature overnight. The azodicarboxylate-butyl rubber product formed was purified by multiple solution-precipitation employing hexane as the solvent and acetone as the anti-solvent for three times. The product was then freed of residual solvents by heating in a vacuum oven at 24 inches of water vacuum for 16 hours at 60° C. The resulting reaction product of the azodicarboxylate compound and butyl rubber was rubbery in nature.

One hundred parts by weight of the foregoing rubbery product were compounded into the following recipe:

| Component: | Parts by weight |
|---|---|
| Stearic acid | 1.0 |
| Carbon black (MPC) | 50.0 |

The above mixture was hot milled for ten minutes at 300° F., which rendered the same substantially uniform and homogeneous. The hot milled stock was then cooled to 75° F., the following ingredients being then added:

| Component: | Parts by weight |
|---|---|
| Zinc oxide | 5 |
| Sulfur | 2 |
| Tellurium diethyl dithiocarbamate | 1 |

The foregoing compounded stock was then cured for 60 minutes at 307° F., an unmodified control being compounded and cured in the same manner. These two stocks were then compared, their physical inspections being as follows:

| Compounded Stock | Resistivity, ohm-cm. | Modulus at 300% Elong., p.s.i. | Tensile Strength, p.s.i. | Elong. (percent) |
|---|---|---|---|---|
| Unmodified Butyl Rubber | 1.458×10¹⁰ | 1,500 | 2,475 | 450 |
| Azodicarboxylate Modified Butyl Rubber | 2.571×10¹⁰ | 1,875 | 2,950 | 450 |

The above data show that the azodicarboxylate-butyl rubber exhibits about 1½ times the resistivity of the unmodified butyl rubber. This renders the modified butyl rubber more desirable for electrical insulation, facilitates better carbon black dispersion, and permits larger amounts of carbon black to be dispersed therein. In addition, the azodicarboxylate-modified butyl rubber exhibits a combination of a high tensile strength (2950 p.s.i.) and a high modulus (1875 p.s.i. at 300% elongation) compared to a lower 2475 p.s.i. tensile strength and 1500 p.s.i. modulus for unmodified butyl rubber under the same conditions.

*Example II*

The same general procedure as in Example I was repeated using instead of 1.52 grams of crude ethylazodicarboxylate, 6.07 grams of freshly distilled ethylazodicarboxylate (boiling point at 16 mm. of mercury being 121° to 126° C.). The only modification in the procedure was that the reaction mixture was refluxed at a temperature of 65° C. for 4 hours prior to allowing the same to cool to room temperature and stand overnight. The rubbery azodicarboxylate-modified butyl polymer was found to be rubbery in nature and was hot milled with stearic acid and MPC black prior to adding the zinc oxide, sulfur and tellurium diethyl dithiocarbamate in the same general manner as in Example I.

Upon curing for 60 minutes at 307° F., the azodicarboxylate modified butyl rubber vulcanizate compared to the unmodified butyl rubber control as follows:

| Compounded Stock | Resistivity, ohm-cm. | Modulus at 300% Elong., p.s.i. | Tensile Strength, p.s.i. | Elong. (percent) |
|---|---|---|---|---|
| Unmodified Butyl Rubber Control | 1.458×10¹⁰ | 1,500 | 2,475 | 450 |
| Azodicarboxylate Modified Butyl Rubber | 1.866×10¹⁰ | 1,900 | 3,100 | 480 |

The above data show that the azodicarboxylate modified butyl rubber vulcanizate exhibits improved characteristics in resistivity, modulus, tensile strength and elongation. The greatest improvements noted are in modulus (1900 p.s.i. compared to 1500 p.s.i.) and in tensile strength (3100 p.s.i. compared to 2475 p.s.i.). It is evident that the azodicarboxylate modification imparts substantially better properties to the vulcanizate formed.

*Example III*

The same general procedure was repeated using the experimental conditions of Example I but substituting 1.55 grams of ethylphenylazocarboxylate for the 1.52 grams of ethylazodicarboxylate.

Upon compounding as in Example I and curing for 60 minutes at 307° F., the azomonocarboxylate modified butyl rubber vulcanizate compared to the unmodified butyl rubber control as follows:

| Compounded Stock | Resistivity, ohm-cm. | Modulus at 300% Elong., p.s.i. | Tensile Strength, p.s.i. | Elong. (percent) |
|---|---|---|---|---|
| Unmodified Butyl Rubber Control | 1.458×10¹⁰ | 1,500 | 2,475 | 450 |
| Azomonocarboxylate Modified Butyl Rubber | 3.853×10¹⁰ | 1,650 | 2,800 | 450 |

The above data show that the modulus and tensile strength of the azomonocarboxylate-modified butyl rubber were both somewhat better compared to the unmodified butyl rubber. The modified butyl rubber also exhibited over twice the resistivity compared to the unmodified rubber. This renders the azomonocarboxylate-modified butyl rubber more desirable for electrical insulation, facilitates better pigment dispersion, and permits larger amounts of fillers to be dispersed therein.

One particularly advantages use of the azocarboxylate modified butyl rubber compositions of the present invention is in pneumatic tires of either the inner tube containing variety or in the tubeless type tires. Referring now to the drawing, there is shown a pneumatic-tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute the bead portions 11—11 of the tire inside of which are a plurality of bead wires adhesively embedded and molded in a rubber. The outer surface of the bead portion is advantageously formed into an air-sealing means such as a plurality of ribs to aid in adhesion to rim 12 when the tire is inflated. The outer surface of the tire also includes tread area 13 and sidewalls 14. The open portion of the horseshoe shaped tire faces that portion of the inner circumference of the tire which is adjacent the said tread area 13 of the tire.

The remaining construction of the tire may vary according to conventional fabrication, but in general, the tire is a multi-layered type of structure with an outer layer as above mentioned. The layer next adjacent the outer layer generally comprises a carcass 15 which includes a rubber which has incorporated therein a fabric composed of a plurality of cotton, rayon, or nylon cords, etc. The tire also includes an inner lining 16, advantageously made from rubber; e.g., an azocarboxylate-modified butyl rubber which has been at least partially vulcanized for about 1 to 60 minutes at about 200° to 400° F. in accordance with the invention. This inner lining must be substantially impermeable to air. The above multilayers, at least three in number, are conventionally bonded or otherwise adhered together, for example, by cementing and/or by vulcanizing according to the invention to form a tire of a unitary structure.

The compositions comprising butyl rubber reacted with azocarboxylate compounds of the present invention may be employed generally throughout the tire. For example, the inner lining 16 may comprise an azocarboxylate-modified butyl rubber which has been vulcanized. Alternatively, the inner lining 16 may comprise ordinary butyl rubber which has been bonded to carcass 15 by an interposed tie-ply of an azocarboxylate-modified butyl rubber which has been vulcanized. Such an interposed tie-ply facilitates the inclusion of highly unsaturated rubbers such as natural rubber, GR-S rubber, Buna-N rubber, mixtures thereof, etc., in the carcass.

The other layers of the tire, such as the intermediate carcass layer and/or the outer layer (including the tread area, the sidewall and the outer bead portions, etc.) may also comprise butyl rubber reacted with an azocarboxylate compound which has been vulcanized in accordance with the invention. Vulcanization of the carcass, plies (if any), sidewalls, and tread area is advantageously accomplished by heating the same for about 3 to 60 mintes or more at about 250° to 400° F. The butyl rubber-azocarboxylate compound-containing compositions of the present invention included in the tire also preferably contain certain bivalent metal oxides (especially zinc oxide), sulfur, a vulcanization ultra-accelerator and a filler, with or without a resin-tackifier, etc.

The tubeless tire may also contain, in at least the tread area 13, an oil-extended high molecular weight (e.g., viscosity average molecular weight of about 900,000 to about 2,000,000) butyl rubber which has been bonded to a more highly unsaturated rubber (or rubbers) in carcass 15 by an interposed tie-ply of butyl rubber reacted with an azocarboxylate compound which has been advantageously vulcanized in the presence of sulfur, an ultra-accelerator, a bivalent metal oxide, and a filler, with or without a resin-tackifier.

The expression "layer" as employed in the claims is intended to include plies and liners as well as such layers as the carcass, sidewalls, tread area, etc.

The compositions containing the reaction product of butyl rubber with an azocarboxylate compound in accordance with the present invention, may be employed for a wide variety of applications other than for tubeless or inner tube containing tires, such as in electrical insulation, tire curing bags or bladders, inner tubes, car window channel strips, proofed goods, and other applications where butyl rubber has utility.

Resort may be had to modifications and variations without departing from the spirit of the invention or the scope of the appended claims.

What is claimed is:

1. A composition comprising the reaction product of an unvulcanized copolymer of a $C_4$ to $C_8$ isoolefin and a $C_4$ to $C_{14}$ multiolefin with a minor proportion of a mono-azocarboxylated hydrocarbon, said reaction product containing up to 1 molecule of an azocarboxylated hydrocarbon per double bond in the copolymer; said reaction product being processable at room temperature or elevated temperatures but being vulcanizable only upon the subsequent addition of curatives followed by heating.

2. Composition according to claim 1 in which the mono-azocarboxylated hydrocarbon is selected from the group consisting of $C_1$ to $C_{18}$ alkyl, alkaryl, cycloalkyl, aryl and aralkyl azocarboxylates having 1 to 2 carboxyl groups.

3. A tire containing in at least one layer thereof the composition of claim 1.

4. A composition comprising the reaction product of an isoolefin-multiolefin butyl rubber polymer with about 0.1X to X weight percent of a mono-azocarboxylated hydrocarbon, wherein:

$$X = \frac{A(L)}{(100-L)M_1 + L(M_2+A)} \times 100$$

and:

$L$ = mole percent of the multiolefin in the polymer,
$M_1$ = molecular weight of the isoolefin,
$M_2$ = molecular weight of the multiolefin, and
$A$ = molecular weight of the mono-azocarboxylated hydrocarbon, said reaction product being processable at room temperature or elevated temperatures but being vulcanizable only upon the subsequent addition of curatives followed by heating.

5. Composition according to claim 4 in which the mono-azocarboxylated hydrocarbon has the general formula:

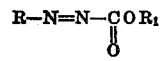

wherein R and $R_1$ are selected from the group consisting of $C_1$ to $C_{18}$ alkyl groups, $C_3$ to $C_{18}$ cycloalkyl groups, and $C_6$ to $C_{18}$ aryl, aralkyl and alkaryl groups, and mixtures thereof.

6. Composition according to claim 5 in which the mono-azocarboxylated hydrocarbon is ethylphenylazocarboxylate.

7. Composition according to claim 6 in which the mono-azocarboxylated hydrocarbon is phenylhexylazocarboxylate.

8. Composition according to claim 4 in which the mono-azocarboxylated hydrocarbon has the general formula:

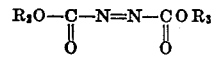

wherein $R_2$ and $R_3$ are selected from the group consisting of $C_1$ to $C_{18}$ alkyl groups, $C_3$ to $C_{18}$ cycloalkyl groups, and $C_6$ to $C_{18}$ aryl, aralkyl and alkaryl groups, and mixtures thereof.

9. Composition according to claim 8 in which the mono-azocarboxylated hydrocarbon is ethyl mono azodicarboxylate.

10. Composition according to claim 8 in which the mono-azocarboxylated hydrocarbon is phenyl mono azodicarboxylate.

11. Composition according to claim 8 in which the mono-azocarboxylated hydrocarbon is ethyl phenyl mono azodicarboxylate.

12. A mono-azocarboxylate-modified butyl rubber tie-ply composition comprising about 100 parts by weight of an isoolefin-multiolefin butyl rubber copolymer containing up to 1 molecule of a combined mono-azocarboxylate per double bond in the rubber; about 2–30 parts by weight of a basic metal oxide; about 5–20 parts by weight of a resin selected from the group consisting of phenolic-aldehyde resins, urea-aldehyde resins, glyptal resins, and polyvinyl alkanal resins; about 5–100 parts by weight of a filler selected from the group consisting of a carbon black, a silica, and mixtures thereof; about 0.3–3 parts by weight of an accelerator; and a vulcanizing amount of sulfur, said composition being unvulcanizable in the absence of curatives.

13. In a tire adapted for use without an inner tube, the combination which comprises an open bellied body terminating in spaced bead portions having an inner lining of butyl rubber modified so as to contain not more than one molecule of a combined mono-azo ester per double bond in the polymer, air sealing means at said bead portions, and a tread area intermediate of said bead portions, 100 parts by weight of the mono-azo ester modified butyl rubber composition consisting of an isoolefin with a multiolefin formed having been at least partially vulcanized in the presence of 0–100 parts by weight of a filler, vulcanizing quantities of sulfur, about 0–20 parts by weight of a phenolic aldehyde resin and about 2–30 parts by weight of zinc oxide said composition being unvulcanizable in the absence of curatives.

14. In a tire adapted for use without an inner tube, the combination which comprises an open bellied body terminating in spaced bead portions, an inner lining, air sealing means at said bead portions, and a tread area intermediate of said bead portions, the composition of at least said tread area comprising a major proportion of an oil extended butyl rubber consisting of an isoolefin with a multiolefin reacted with up to one molecule of a combined mono-azocarboxylate compound per double bond in the butyl rubber polymer consisting of an isoolefin with a multiolefin, said composition having been cured in the presence of added curatives at a temperature level between about 250° and 400° F. said composition being unvulcanizable in the absence of added curatives.

15. An unvulcanized composition comprising a major proportion of the reaction product of a copolymer of about 90 to 99.5 weight percent isobutylene and about 5 to 0.5 weight percent of a $C_4$ to $C_{10}$ multiolefin with about 0.2 to 0.6 mole per double bond in said copolymer of a $C_1$ to $C_{18}$ mono-azocarboxylated hydrocarbon, and a minor proportion based on total composition of a pigment.

16. A tire containing in at least the carcass layer thereof the composition of claim 15.

17. A process for the preparation of a mono-azocarboxylate-modified butyl rubber isoolefin-multiolefin copolymer, said modified rubber being unvulcanized without added curatives, said process comprising dissolving a butyl rubber polymer consisting of an isoolefin with a multiolefin in an inert solvent, adding to the rubber solution formed a minor proportion but insufficient quantities to combine more than one molecule of a mono-azocarboxylate compound per double bond in the polymer, regulating the reaction mixture to a temperature between about 0° and 150° C., and recovering the mono-azocarboxylate-modified rubber from the reaction mixture.

18. In a process for manufacturing a tubeless tire including a carcass member, the combination which comprises at least partially vulcanizing in the presence of added curatives to said carcass member a layer disposed interiorly thereof, which layer comprises a rubbery copolymer containing about 85 to 99.5 weight percent of an isoolefin and a minor proportion of a multiolefin, said copolymer having been reacted with about 0.1 to 1.0 mole of a mono-azo ester per double bond in the copolymer, and vulcanizing in the presence of added curatives to said carcass member a butyl rubber isoolefin-multiolefin copolymer containing-layer disposed exteriorly thereof; said last-named copolymer having been reacted with about 0.2–0.6 mole of a mono-azo ester per mole of double bonds in said copolymer.

19. In a process for manufacturing a tire including a carcass member, the combination which comprises coating the surfaces of said carcass member with at least one curative and a composition comprising the reaction product of a mono-azo ester with a copolymer prepared from a feed composed of about 100–800 parts by weight of a diolefin and 100 parts by weight of an isoolefin, coating the surfaces of the layers to be joined to each side of said carcass member with a composition comprising the reaction product of a mono-azo ester with a copolymer prepared from a feed composed of about 2 to 100 parts by weight of a diolefin and 100 parts by weight of an isoolefin, placing the respective layers with their coated surfaces touching the coated surfaces of the carcass member, compressing the composite formed, and vulcanizing the same at a temperature level between about 250° and 400° F. to produce a laminated tire structure of improved physical characteristics.

References Cited in the file of this patent

UNITED STATES PATENTS

| | | |
|---|---|---|
| 2,393,321 | Haworth | Jan. 22, 1946 |
| 2,469,819 | Flory et al. | May 10, 1949 |
| 2,566,384 | Tilton | Sept. 4, 1951 |
| 2,575,249 | Connell et al. | Nov. 13, 1951 |
| 2,698,042 | Perkins | Dec. 28, 1954 |
| 2,825,382 | Peterson et al. | Mar. 4, 1958 |
| 2,839,117 | Clayton | June 17, 1958 |